Nov. 14, 1933.  V. G. APPLE  1,934,903
DYNAMO-ELECTRIC MACHINE AND METHOD OF MAKING IT
Filed June 10, 1929   5 Sheets-Sheet 1
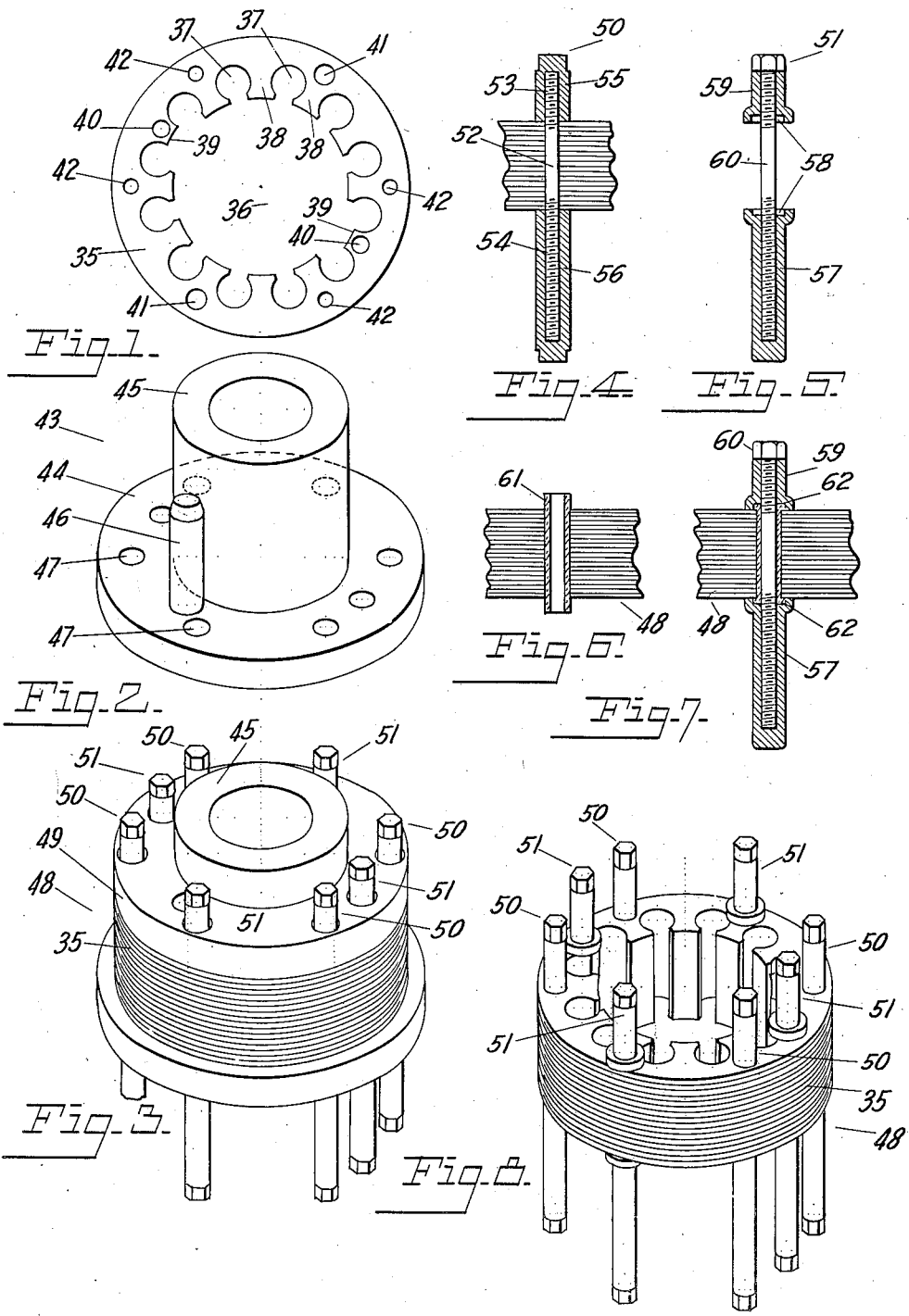
INVENTOR.

Nov. 14, 1933.     V. G. APPLE     1,934,903
DYNAMO-ELECTRIC MACHINE AND METHOD OF MAKING IT
Filed June 10, 1929     5 Sheets-Sheet 2
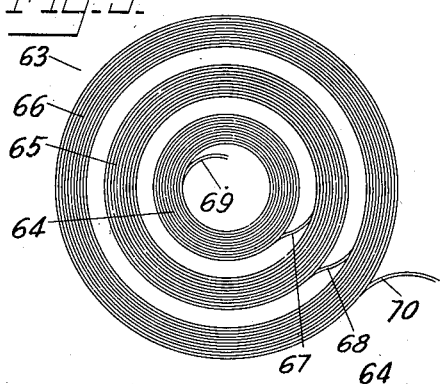
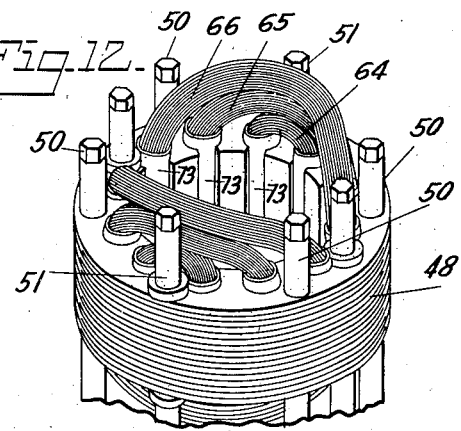
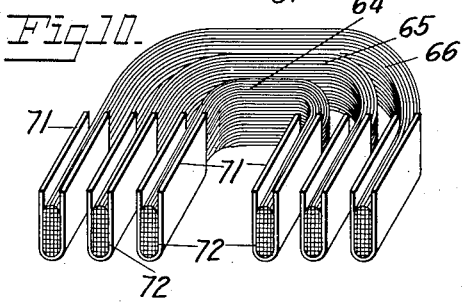
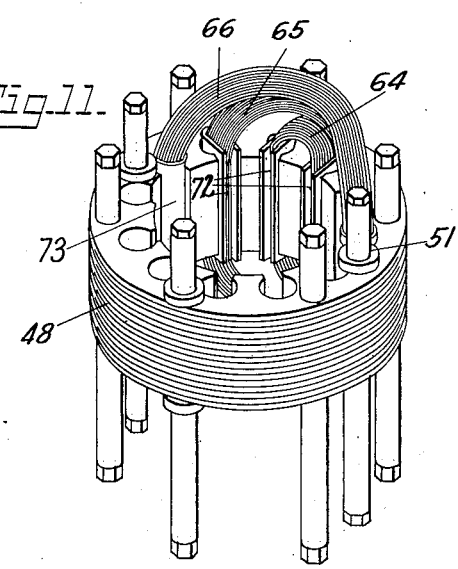
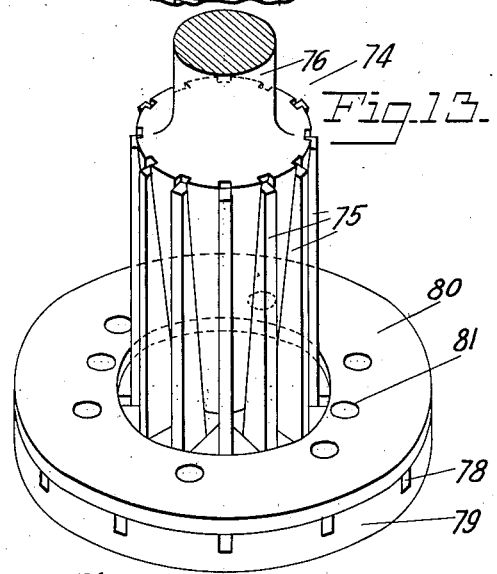
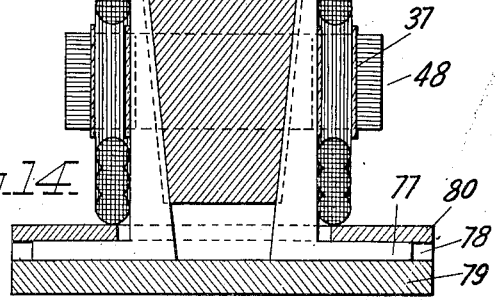
INVENTOR.

Nov. 14, 1933.　　　　V. G. APPLE　　　　1,934,903
DYNAMO-ELECTRIC MACHINE AND METHOD OF MAKING IT
Filed June 10, 1929　　　5 Sheets-Sheet 3
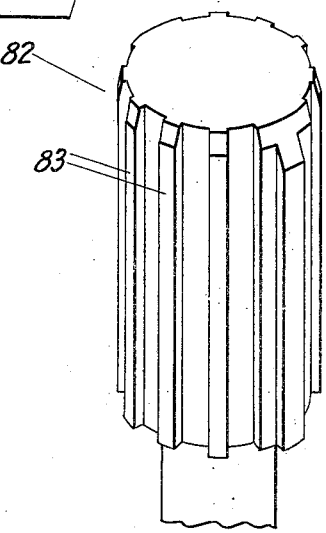
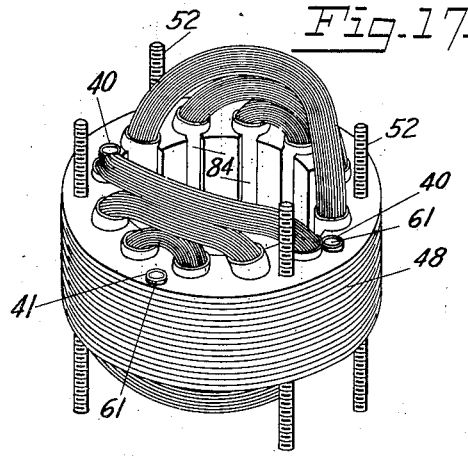
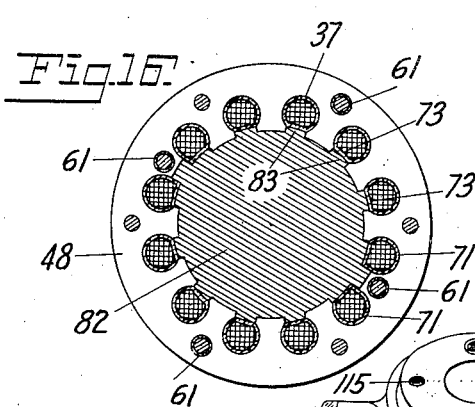
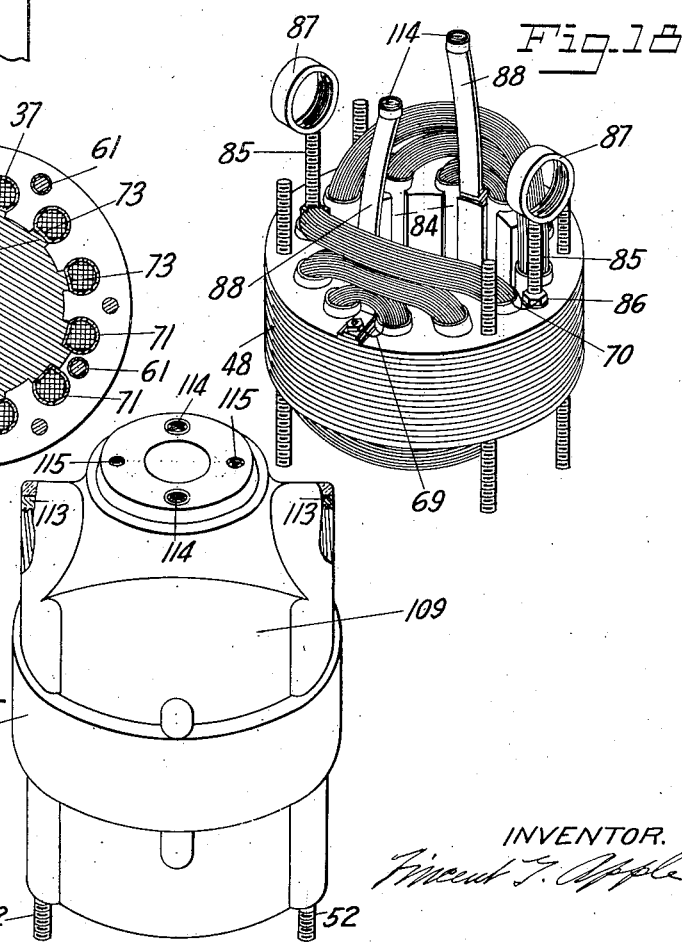
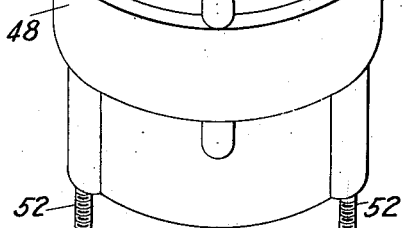
INVENTOR.

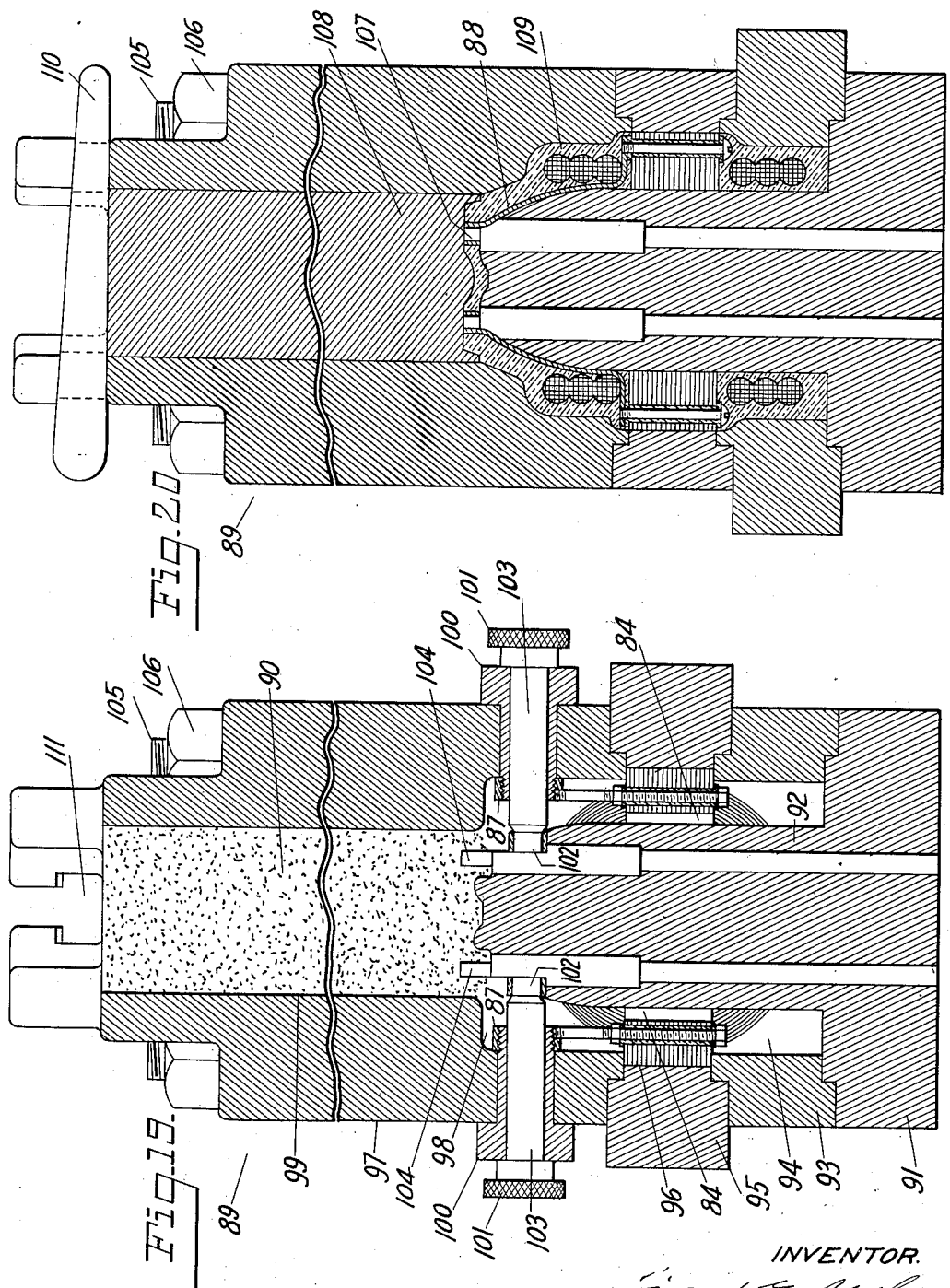

Nov. 14, 1933.     V. G. APPLE     1,934,903
DYNAMO-ELECTRIC MACHINE AND METHOD OF MAKING IT
Filed June 10, 1929     5 Sheets-Sheet 5
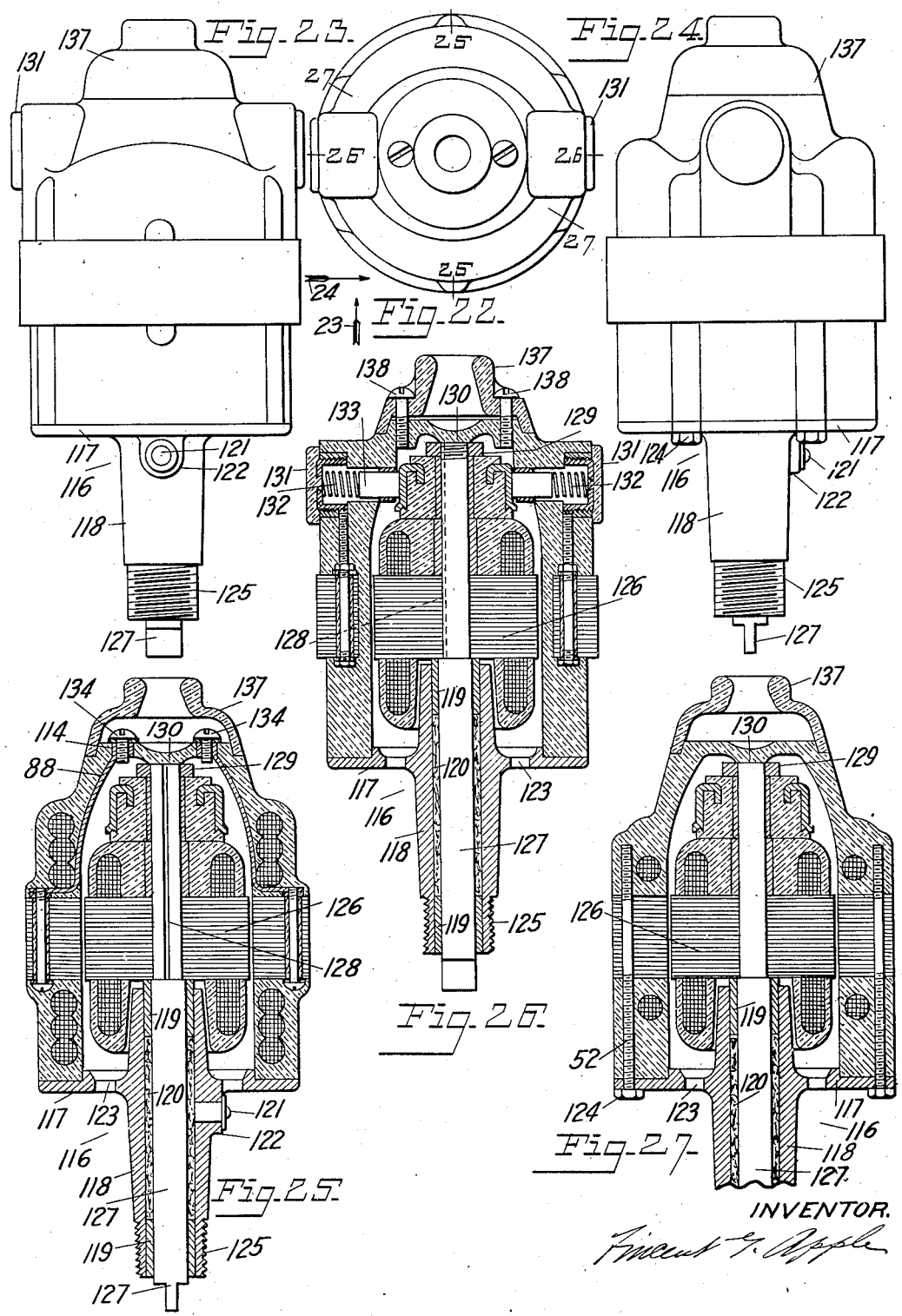
INVENTOR.

Patented Nov. 14, 1933

1,934,903

UNITED STATES PATENT OFFICE 1,934,903

DYNAMO ELECTRIC MACHINE AND METHOD OF MAKING IT

Vincent G. Apple, Dayton, Ohio; Herbert F. Apple, Edward M. Apple, and Gourley Darroch executors of said Vincent G. Apple, deceased Application June 10, 1929. Serial No. 369,564

8 Claims. (Cl. 172—36)

This invention relates to dynamo electric machines and specifically to that type wherein the field and armature both comprise a core of magnetic material, a winding about the core, and a casing of molded insulation covering the winding and cementing it to the core.

An object of the invention is to generally improve a dynamo electric machine of this class.

Another object is to provide an improved method of making a dynamo electric machine of this class.

A more specific object is to improve the insulation between the turns of the windings and between the windings and the core.

Another specific object is to facilitate the placing of windings on cores.

Further objects will be apparent from a consideration of the following description when taken in conjunction with the drawings, wherein:

Fig. 1 shows a single field core lamina.

Fig. 2 shows a fixture upon which a predetermined number of laminæ Fig. 1 may be assembled to compose a field core.

Fig. 3 shows the fixture Fig. 2 with a core composed of laminæ Fig. 1 stacked thereon, a relatively thick washer being provided to compact the laminæ until clamping tools may be applied to hold them together.

Fig. 4 shows one form of clamping tool to be used in a portion of the lamina openings.

Fig. 5 shows a different kind of clamping tool to be used in other of the lamina openings, this tool being adapted also to form a lining of insulation in the holes within which they are placed.

Fig. 6 shows the lining of insulation as it appears when first placed in the core opening.

Fig. 7 shows the clamping tool Fig. 5 applied to hold the lamina together and to form the lining of insulation in the core opening.

Fig. 8 shows the field core held together by clamping tools Figs. 4 and 5 after the assembling fixture Fig. 2 has been removed.

Fig. 9 shows a coil for the field winding, wound in three interconnected parts to adapt it to the toothed core Fig. 8.

Fig. 10 shows how insulation treated tape is placed around the portions of the field coils which are to be entered into the core slots, and how the coils are then pressed flat so that they may enter through the relatively narrow openings into the slots.

Fig. 11 shows one coil Fig. 9 in a field core Fig. 8.

Fig. 12 shows both coils Fig. 9 in the field core Fig. 8.

Fig. 13 shows an expanding tool for forcing the field coils more deeply into the core slots.

Fig. 14 shows the expanding tool Fig. 13 in a wound field core Fig. 12.

Fig. 15 shows a solid plug which is substituted for the extending tool Fig. 13 after it is removed from the wound field core.

Fig. 16 shows a wound field core with the plug Fig. 15 in place.

Fig. 17 shows the wound field core with all of the tools removed.

Fig. 18 shows the wound field core Fig. 17 after brush and line terminals have been secured thereto and the coil ends joined to the terminals.

Fig. 19 shows the structure Fig. 18 in a mold, with a charge of unmolded insulation ready to be pressed about the windings and terminals.

Fig. 20 shows the completed field element in the mold.

Fig. 21 shows the completed field element after removal from the mold.

Fig. 22 is a top view of the completed machine.

Figs. 23 and 24 are elevations looking in the direction of arrows 23 and 24 respectively of Fig. 22.

Figs. 25, 26 and 27 are vertical axial sections taken at 25—25, 26—26, and 27—27 respectively of Fig. 22.

Similar numerals refer to similar parts throughout the several views.

The field core lamina 35, Fig. 1 has a central opening 36 for an armature. A number of winding slots 37 are separated by teeth 38. To adapt the laminæ to a bipolar field two teeth are shortened as at 39.

Openings 40 and 41 are provided to admit screws for attaching the brush and line terminals respectively, and openings 42 to admit studs for attaching a bearing head to the completed core.

Openings 40 and 41 are sufficiently larger than the screws which must pass through them to permit them to be lined with insulation, so that the terminals which are attached by these screws will be insulated from the core.

The fixture 43 Fig. 2 has a flange 44 slightly larger than the laminæ, a hub 45 adapted to fit snugly into the central opening 36 of the laminæ, a pin 46 extending upwardly from flange 44 and adapted to fit snugly into one of the winding slots 37 of the laminæ, and a series of small holes 47 corresponding in location to the holes 40, 41 and 42 of the laminæ 35.

A field core 48 is formed by loosely stacking a plurality of laminæ 35 over hub 45, placing a relatively thick washer 49 over the end of the hub, pressing the laminæ together by applying pressure to the washer, and securing the laminæ together by clamping tools passing through holes 40, 41 and 42 of the laminæ so as to allow the fixture 43 and the washer 49 to be removed.

The clamping tools which secure the laminæ of the core 38 together are of two slightly different kinds, four broadly designated by numeral 50 being constructed as shown in the fragmentary section Fig. 4 and the other four broadly designated by the numeral 51 as shown in the cross section Fig. 5.

In Fig. 4 a stud 52 having threaded portions 53 and 54 passes through a small hole 42 in the core laminæ (see Fig. 1) and elongated closed-end nuts 55 and 56 are threaded on the ends of the stud against the outside laminæ to hold the core together.

The clamping tool shown in Fig. 5 comprises a relatively long nut 57 with one end closed and the other end open and counterbored as at 58, a collar 59 also counterbored as at 58, and a long screw 60 extending through the collar 59 and into the nut 57. Four of these screws are used in the holes 40 and 41, Fig. 1, which are somewhat larger than the screws.

Before putting screws 60 through holes 40 and 41 of the core a tube 61, preferably made by rolling up a length of insulation treated tape, is put through each hole 40 and 41 as in Fig. 6. These tools are of such length as will extend considerably beyond the core at both ends, as shown. Now when the screw 60 is passed through collar 59 and through tube 61 into nut 57 and is drawn up, the extending ends of the tube are formed into heads as at 62 (see Fig. 7).

When the clamping tools are all applied and the stacking fixture is removed the field core appears as in Fig. 8 and is ready to have the winding applied thereto.

The field core winding consists of two coils 63 Fig. 9 each wound in three parts 64, 65 and 66, joined at 67 and 68. Part 64 begins at 69 and part 66 ends at 70. The coils are preferably wound of magnet wire which has been insulation treated, prior to winding it into coils, as described in my co-pending application Serial No. 356,586, filed April 19th, 1929.

Having provided the coils 63 as shown in Fig. 9, strips of insulation treated tape 71 are lapped around the coil sides before placing them into the winding slots 37, and these taped parts of the coils are flattened as at 72. A cross section through a coil 63 showing the flattened coil sides 72, with tape 71 looped around them, is shown in Fig. 10. The flattened coil sides 72 may now be entered through the narrow openings of the core slots 37.

The kind of insulating material used and the manner in which it is applied to the wire leaves the coils 63 very pliable, so that the flattened tape-covered coil sides 72 are readily brought back to circular contour after they are in the round part of the slot by pressing them toward the bottoms of the slots. Fig. 11 shows several coil sides 72 still flattened and extending partly out of their respective slots, while several others are pressed into the slots and the ends of the tape tucked in as at 73. Fig. 12 is another view of the core after all of the coil sides are completely in the slots and have the tape tucked in around them as at 73, 73, etc.

In order to place the coil sides in the core slots more uniformly, and to a slightly greater depth, the expanding tool 74, shown in Fig. 13, is provided. This tool comprises a series of jaws 75 adapted to be moved radially outward by forcing the tapered plug 76 downward. The jaws are guided in radial paths by L shaped extensions 77 at their lower ends movable in radial slots 78 in the base 79. The plate 80 covers the extensions 77 and keeps them in the guide slots 78. Holes 81 are positioned to admit the clamping tools shown in Figs. 4 and 5.

Fig. 14 shows the expanding tool 74 within the structure Fig. 12, with the tapered plug 76 pressed downward and the jaws 75 radially outward into the core slots 37. It is in this form that the structure is preferably baked to harden the insulation, but in order to economize on the number of expanding tools needed, the expanding tool 74 is withdrawn and a plug 82 Fig. 15, having keys 83, corresponding to the expanding tool in its expanded state, is substituted. The transverse section Fig. 16 shows how the tape enclosed coil sides 73 are kept away from the outer narrow entrances of the core slots 37 by the keys 83.

The structure Fig. 16 is now placed in an oven and baked to harden the insulation between the turns of the coils, and in the strips 71 of insulation treated tape, and in the insulation treated tubes 61. When the insulation becomes thoroughly hard the plug 82 and the clamping tools 51 and the nuts 55 and 56 from the clamping tools 50 are removed, leaving the structure as it appears in Fig. 17, and while the studs 52 were used as parts of the clamping tools which held the laminæ together, they now are left in the core 48 to become a part of the permanent structure.

By considering Figs. 12, 16 and 17 it will be apparent that if the coils are baked with the plug 82 and the clamping tools 50 and 51 in place there is assurance that the studs 52 will be well spaced apart from the hardened coil, and that the coil will always be in the clear from the screws that must afterward be passed through holes 41. Also there are spaces 84 left by keys 83 of plug 82 the utility of which will hereinafter appear.

Fig. 18 shows the field element after brush and line terminals have been secured thereto. Threaded studs 85 pass through tubes 61 in holes 40 and are secured by nuts 86. Studs 85 support tapped rings 87 through which current is conveyed to and from the brushes. Other screws extend upwardly through the tubes 61 of holes 41 and into line terminals 88. The terminals are thus mechanically joined to the core though electrically insulated therefrom. The ends 70 of the coils are attached to the brush terminals and the ends 69 to the line terminals. Having reached this stage the field element is ready to have a housing of plastic insulation molded to and about it.

Fig. 19 is a vertical axial section through a mold 89 into which the wound field element Fig. 18 has been placed together with a suitable quantity of moldable material 90. Mold 89 comprises a base 91 having a vertically extending plug 92 of such diameter as will fit into the armature bore 36 of the core, a section 93 of internal diameter 94 somewhat less than the outside of the core, a section 95 of an internal diameter 96 equal to the outside of the core and a section 97 hollowed out at the lower end as at 98 somewhat less than the outside of the core, the upper end being bored to a considerably smaller diameter as at 99. The upper section 97 has laterally enterable sleeves 100 threaded at their ends to keep tapped rings 87 in correct location and pull plugs 101 of rectangular cross-section at their inner ends 102 to form pockets of rectangular brushes and of round cross-section at 103 to form pockets for round brush springs.

Pull plugs 101 are slidably fitted into sleeves 100. Pins 104 extend upwardly from plug 92 to form holes in the finished molding. These holes are afterwards tapped and employed in attaching another part. Bolts 105 extending lengthwise through all of the sections and nuts 106 hold the sections clamped together.

Fig. 20 is another vertical axial section through mold 89 taken on a plane at right angles to the plane of Fig. 19 and cutting through the line terminals 88. Pins 107 extend upwardly from the upper end of plug 92 to support the line terminals at their upper ends and to exclude insulation from the terminal screw openings. The mold is here shown with a plunger 108 forced into place and the moldable material 90, Fig. 19, forced downward about the core, the terminals and the winding to compose the housing 100 of insulation. The wedge 110 is shown entered into the T slot 111, Fig. 19, to hold plunger 108 down after it has been forced into position by any suitable press.

In practice the structure Fig. 18 is placed in the mold 89 in the position shown in Fig. 19 and the parts of the mold are clamped together by bolts 105 and nuts 106. The mold is then heated to a temperature sufficient to flux the moldable material 90, and when proper heat is reached, the material is placed into the opening 99 and the plunger 108 is entered.

As soon as the material 90 absorbs sufficient heat from mold 89 to become fluid, the plunger 108 is pressed downward, forcing the fluid first somewhat laterally over the upper end of plug 92, into space 98, downwardly through the spaces 84 left by the keys 83 of plug 82 (see Figs. 15 to 18), and into the space 94, to completely fill all portions of the interior of the mold not occupied by the core, the winding and the terminals. The wedge 110 is then inserted and the insulation left to harden.

When the insulation is sufficiently hard the wedge 110 is withdrawn, the nuts 106 are removed, the sections 91, 93, 95 and 97 are separated and the field element 112 is complete. Fig. 21 shows the completed field element after it is removed from the mold, with studs 52 extending slightly from one end of the insulation to hold a bearing head in place, metal lined pockets 113 to admit and carry current to the brushes, terminal screw openings 114 for receiving screws to attach the separated ends of a lamp cord and screw holes 115 for attaching a cap to cover the cord connections.

Figs. 22 to 27 show the completed machine, 22 being a top view, 23 and 24 elevations looking in the direction of arrows 23 and 24, and 25, 26 and 27 vertical axial sections taken on lines 25—25, 26—26, and 27—27, respectively.

The bearing head 116 comprises a flange 117, having a long hub 118 within which are two widely spaced apart bearing bushings 119 with a tube 120 of felt between. An oil cup 121 extends through boss 122 to tube 120 to convey oil thereto. Ventilating openings 123 extend through flange 117. Studs 52 also extend through flange 117, and nuts 124 hold the head secured to the field element. A thread 125 on the end of hub 118 is provided so that a casing for a flexible shaft may be joined thereto when that means of conveying the power of the motor is employed.

The armature 126 comprises the usual core, the usual fine wire winding and a commutator, such as I show and describe in my co-pending application Serial No. 290,680, filed July 5th, 1928. The core is secured to the shaft 127 by integral keys in the armature laminæ extending into a keyway 128 in the shaft. A nut 129 prevents axial movement of the armature on the shaft. The shaft in turn is held against axial movement in the field element in the one direction by the armature core bearing on a bushing 119, and in the other direction by the end of the shaft abutting a boss 130 molded in the field element.

Insulation covered metal brush caps 131 screwed into rings 87 convey current to brush springs 132, through brushes 133 thence to the armature. Screws 134 extending into openings 114 of the line terminals 88 are adapted to attach the separated ends of a lamp cord thereto whereby current may be conveyed to the field winding.

A cap 137 of molded insulation is attached to the field element by screws 138 to cover the cord connections.

Having described my invention,
I claim,

1. The method of making a wound core, which consists of placing coils saturated with liquid insulation on the core, placing forming means adjacent the coils to hold them to a definite shape, hardening the liquid insulation, then removing the forming means.

2. The method of making a wound element, which consists of stacking laminæ to form a core, placing bolts through certain openings in the core, placing elongated nuts on the bolts to temporarily hold the core laminæ together, placing coils saturated with liquid insulation capable of being hardened on the core, pressing the coils against the elongated nuts while the coils are soft, hardening the liquid insulation, then removing the elongated nuts to leave space between the bolts and the coils.

3. A method of applying windings to a magnetizable core, which consists of lapping strips of insulation saturated fabric around the sides of insulation saturated coils, pressing the fabric enclosed coil sides to flatten them, entering the flattened sides through the narrow outer openings of the slots of a core, and again pressing them to reshape them to fit the wider parts of the slots.

4. A method of making a wound magnetic structure, which consists of saturating the wire composing the coils with an adhesive liquid insulation, pressing the coil sides to flatten them, entering the flattened coil sides through the narrow entrances of the core slots, reshaping them to the wider part of the slots, inserting a tool to keep the coil sides from spreading into the narrow entrances of the core slots, hardening the insulation, then removing the tool.

5. A method of making a dynamo electric machine element, which consists of forcing coils saturated with liquid insulation toward the bottoms of the core slots, inserting a tool to occupy the spaces in the slots so vacated, hardening the liquid insulation while the coils are so held, removing the tool, then forcing a jacket of plastic insulation about the coil ends at one end of the core, through the said spaces to and about the coil ends at the other end of the core.

6. A field element comprising a core and coils assembly with brush and line terminals mechanically supported on the core but electrically insulated therefrom and electrically connected to the coils at a point adjacent the core.

7. The dynamo electric machine field element defined in claim 6, and a housing of insulation molded in situ about the core, coils and terminals, the housing being open at one end and closed at the other and having means at the closed end for making connections between the terminals and a lamp cord and for attaching a cover for said connections.

8. A dynamo electric machine comprising, in combination, a molded body of insulation open at one end and closed at the other containing the field element defined in claim 6 and having the line terminals exposed at its closed end, a cap of molded insulation secured to said closed end covering said exposed line terminals and having an opening for admitting line wires to said line terminals, a bearing head covering the open end of said molded body having two spaced apart bearings, and an armature within said field element rotatably supported in said bearings.

VINCENT G. APPLE.